April 28, 1970　　　T. E. FIDDLER　　　3,508,634
ACTUATION DEVICES FOR ADJUSTING AND HOLDING THE
POSITION OF A MECHANISM
Filed Aug. 2, 1968
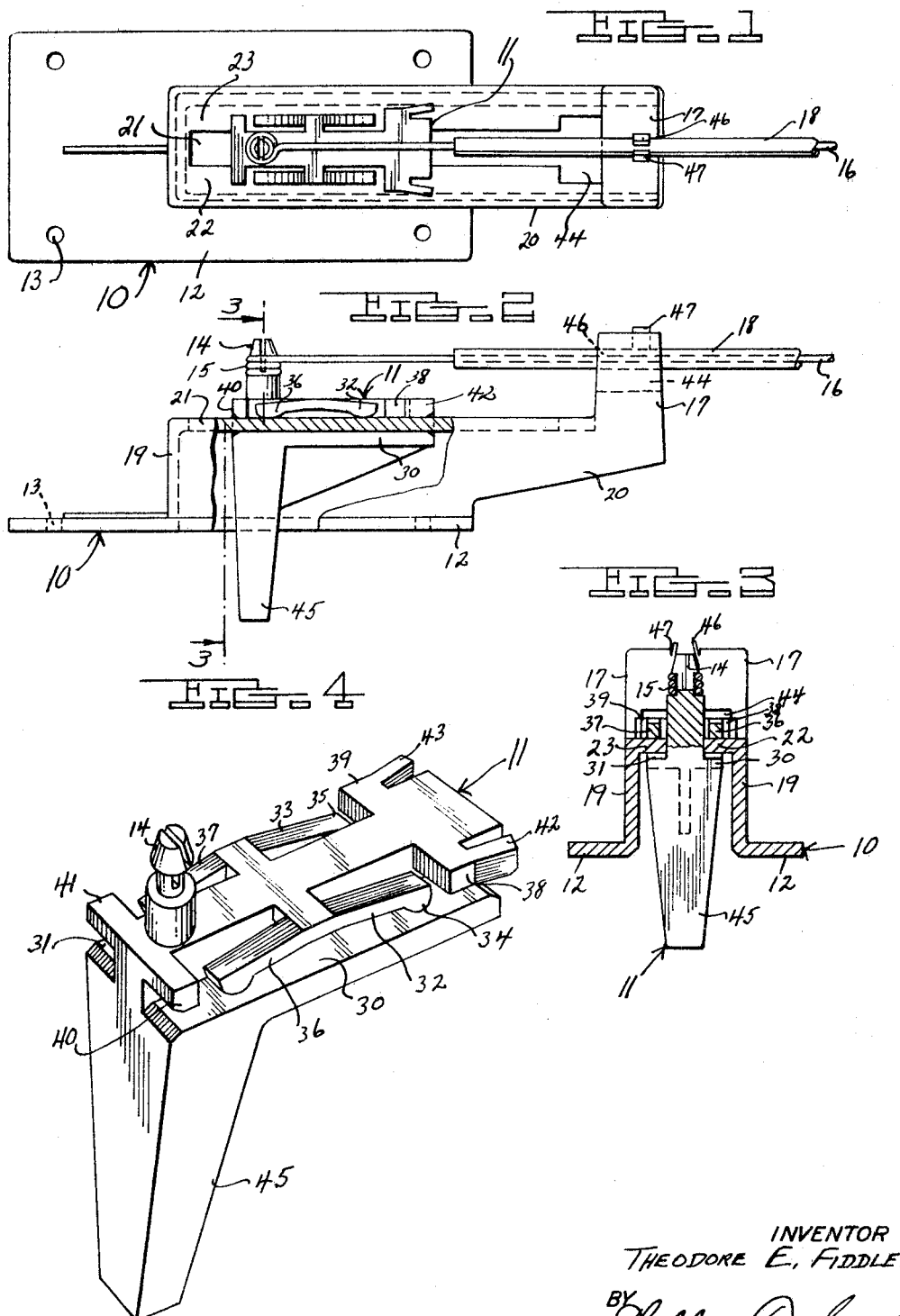
INVENTOR
THEODORE E. FIDDLER
BY
Lillian T. Sevald
ATTORNEY

United States Patent Office 3,508,634
Patented Apr. 28, 1970

3,508,634
ACTUATION DEVICES FOR ADJUSTING AND
HOLDING THE POSITION OF A MECHANISM
Theodore E. Fiddler, 1268 Suffield Drive,
Birmingham, Mich. 48009
Filed Aug. 2, 1968, Ser. No. 749,785
Int. Cl. F16d 63/00
U.S. Cl. 188—1　　　　　　　　　　　　7 Claims

ABSTRACT OF THE DISCLOSURE

An actuator device for locating and holding a mechanism in adjusted position having two injected molded parts; i.e., a slide body and a slider member; wherein the body is equipped with rails and a bridge and the slider member is equipped with alignment blocks, spring arms, skid flanges, a split attachment pin, and an operating handle wherein relative movement of the slider member moves a Bowden wire attached thereto relative to the Bowden sheath mounted on the body bridge to adjust and secure the position of a mechanism connected to the Bowden cable.

---

This invention relates to improvements in actuator devices for adjusting and holding the position of a mechanism with improved effort force in making the adjustment and improved clutching action in the position holding.

Actuator devices for adjusting and holding the position of a mechanism are employed extensively in various fields such as adjusting and holding vent doors in automobiles, valves on carburetors, louvres on air conditioners, etc.

The various devices of the prior art have not proven entirely satisfactory inasmuch as they are complicated in design and construction, employ many small parts, are expensive to manufacture, and are difficult to use with satisfaction in that they do not provide desired smooth sliding non-jamming position adjusting properties and the spring-pressed friction clutch position holding properties balanced relative to one another to provide easy adjustment and secure holding.

With the foregoing in view, the primary object of the invention is to provide an actuator device for adjusting and holding the position of a mechanism which is simple in design and constuction, employs only two parts, which is extremely simple to assemble and therefore inexpensive to manufacture, and which is easy to use and holds securely and that it provides balanced position adjusting movement effort and balanced position holding clutching force.

An object of the invention is to provide a one-piece injection molded slide body having spaced parallel slide rails defining a channel therebetween having an open end surmounted by a bridge for mounting the connecting means leading from the device to the mechanism actuated and paired rails for receiving and retaining the slider member with the rails defining a channel.

An object of the invention is to provide a slider member receivable in the channel of the slide body through the open end of the channel under the bridge having spring wings for bypassing the bridge for assembly and for abutting the bridge to prevent escape of the slider member from the slide body in use.

An object of the invention is to provide skid flanges on the slider member engaging the rail faces on one side of the rail and spring arms on the slider member disposed in opposition to the skid flanges engaging the other faces of the rails to frictionally grip the rails therebetween to provide the desired balanced movement effort force and holding clutch force of the slider member relative to the slide body.

An object of the invention is to provide a first pair of alignment blocks on said slider member at one end thereof and a second pair of alignment blocks on said slider member at the other end thereof for engaging the rails in opposition to the skid flanges so as to prevent canting or cocking of the slider member relative to the slide body to provide non-jamming characteristics.

An object of the invention is to provide a bifurcated pin on the slider member with the bifurcated portions constituting spring fingers which are compressible so that a part, such as a coil on a Bowden cable, may be pressed thereover by compressing the spring fingers with the spring fingers moving back into position to secure the part relative to the slider member.

An object of the invention is to provide a foot on the slider member constituting a handle for moving the slider member relative to the slide body.

These and other objects of the invention will become apparent by reference to the following description of an actuator device embodying the invention taken in connection with the accompanying drawing in which:

FIG. 1 is a top plan view of the device seen in FIG. 2 showing internal construction in dotted lines.

FIG. 2 is a side elevational view of the device seen in FIG. 1, partly in cross-section, showing internal construction in dotted lines.

FIG. 3 is a cross-sectional view of the device seen in FIG. 2 taken on the line 3—3 thereof; and FIG. 4 is an enlarged perspective view of the slider member.

Referring now to the drawing wherein like numerals refer to like and corresponding parts throughout the several views, the actuator device disclosed therein to illustrate the invention, comprises a slide body 10 and a slider member 11. The slide body 10 has a plate 12 equipped with apertures 13 for mounting the slide body. The slider member 11 has a bifurcated pin 14 for connecting with the wire loop 15 of a Bowden wire 16. The slide body 10 has a bridge 17 to which the Bowden cable sheath 18 is secured. Movement of the slider member 11 relative to the slide body 10 moves the Bowden wire 16 relative to the sheath 18 to actuate the device and thus location of the slider member 11 relative to the slide body 10 positions the Bowden wire 16 as desired.

More particularly, the embodiment disclosed to illustrate the invention includes an upstanding housing 19 on the slide member 10. The housing 19 includes projecting arms 20 extending from the plate 12 which support the bridge 17. The top of the housing 19 has a channel 21 centrally disposed. The channel 21 separation in the housing top forms rails 22 and 23 therein.

The slider member 11 is equipped with paired skid flanges 30 and 31 which lie below the paired rails 22 and 23 respectively. Paired spring arms 32 and 33 overlie the skid flanges 30 and 31 respectively and have outer ends 34 and 35 which frictionally engage the rails 22 and 23 respectively. The slider member 11 preferably is also equipped with a second pair of spring arms 36 and 37 oppositely disposed relative to the pair of spring arms 32 and 33 so as to provide substantially equal movement effort and holding force bi-directionally. A pair of alignment blocks 38 and 39 is mounted at one end of the slider member 11 and a second pair of alignment blocks 40 and 41 is mounted at the other end of the slider member. The slider blocks 38–41 are not spring members and do not engage the rails with clamping force but rather guide the slider member relative to the rails 22 and 23 of the slide body 10 so that the slider member 11 cannot cant or cock relative to the slide body 10. Abutment wings 42 and 43 are formed on the slider member 11 such as projecting off the alignment blocks 38 and 39 and these wings 42 and 43 abut the legs of the bridge 17 preventing outward movement of the slider member 11 from the slide body 10. The channel 21 has an enlarged portion 44 adjacent to bridge 17 for admitting the alignment blocks 38 to 41 to a position above the rails 22 and 23 and this also allows the spring arms 32–33 and 36–37 to be located above the rails 22 and 23. A foot 45 is formed on the slide member 11 and constitutes a handle or knob for manually moving the slider member 11 relative to the slide body 10.

In mounting the slider member 11 in the slide body 10, the workman places the slider member 11 under the bridge 17 and moves it upwardly in the opening 14 until the skid flanges 30 and 31 engage the bottom faces of the rails 22 and 23 and this locates the alignment blocks 38–41 and spring fingers 35–34 and 36–37 above the top faces of the rails 22 and 23– The workman then pushes the slider member 11 into the housing 19 and when the wings 42 and 43 contact the bridge 17 legs then spring inwardly allowing the spring wings 42 and 43 to bypass the bridge legs. Upon their bypassing the bridge legs then spring outwardly and prevent escape of the slider member 11 from the slide body 10.

The bridge has a recess 46 which receives the Bowden cable sheath 18 and a clip 47 is provided to jam the Bowden cable sheath 18 in fixed position relative to the bridge 17 thereby mounting the Bowden cable sheath on the slide body 10. The Bowden cable wire 16 has a loop 15 which is pressed over the bifurcated pin 14 on the slider member 11 thereby mounting the Bowden cable wire relative to the slider member 11.

In operation, the user grasps the handle 45 and moves the slider member 11 and wire 16 attached thereto relative to the sheath 18 to adjust the mechanism with which the wire 16 is connected. In this regard the spring arm ends 34 and 35 frictionally engage the top faces of the rails 22 and 23 and provide a necessary movement effort to move the slider member 11 relative to the slide body 10. Upon the termination of manual movement force exerted on the slider member 11, the spring arms 32–33 and 36–37 force on the faces of the rails 22 and 23 in opposition to the skid flanges 30 and 31 effects frictional engagement with the faces of the rails 22 and 23 on the slide body 10. The frictional engagement of the skid flanges and spring arms provides a clutching action to secure the slider member 11 relative to the slide body 10 in any adjusted position to hold the wire 16 at its desired position of extension.

The slide body 10 and slider member 11 are one piece injection molded parts and thus there are only two pieces to entire actuator device. Clip 47 may be eliminated and the sheath 18 staked in the bridge 17 if desired. Since the wire loop 15 attaches without auxiliary fasteners to the bifurcated pin 14, additional parts are also eliminated. The size and material of the spring arms 32–33 and 36–37 and the spacing of their ends 34–35 relative to the skid flanges 30–31 coordinated relative to the thickness of the rails 22 and 23 provide the desired movement effort force and clutching action force and thus the device may be provided with any predetermined force components.

The novel actuating mechanism with the features described constitutes a compact, durable, neat appearing, simple mechanism easily and accurately operable to position and hold a mechanism.

Although but a single embodiment of the invention has been shown and described in detail it is obvious that many changes may be made in the size, shape, detail and arrangement of the various elements of the invention within the scope of the appended claims.

I claim:

1. An actuation device for adjusting and holding the position of a mechanism including a slide body and slider member combination having smooth sliding non-jamming position adjusting characteristics and effective spring pressed friction clutch position holding characteristics comprising, a slide body having paired spaced parallel slide rails defining a channel therebetween with each said rail having opposite faces and exposed edge;

a slider member in said channel between said rails;

said slider member having opposite sides at said rails edges;

paired skid flanges on said slider member opposite sides extending over one said face of each said rail; and at least one pair of torsion spring arms on said slider member opposite sides extending over the other said face of each said rail; and each said spring arm having a projecting end bearing on said other face of said adjacent rail in pressed frictional engagement in opposition to said opposed skid flange to frictionally grip each said rail on both its said faces between said spring arm end and said skid flange;

said slider member and said slide body each being a one piece injection molded part of synthetic resin plastic material;

said spring arm formation, flexure, size and torsional force being coordinated to the desired adjusting and holding characteristics in the combination to provide the friction clutch holding force and the movement effort force desired in the device.

2. In a device as set forth in claim 1, a second pair of torsion spring arms on said slider member oppositely disposed to said pair of torsion spring arms so as to involve bi-directional substantially equal clutch holding force and movement effort force characteristics.

3. In a device as set forth in claim 1, said slider member having opposite ends;

a first pair of alignment blocks on said slider member opposite sides endwise outwardly of said spring arms on one said end of said member overlying said faces of said rails lying spaced from and opposite to said skid flanges; and a second pair of alignment blocks on said slider member opposite sides outwardly of said spring arms on the other end of said slider member lying spaced from and opposite to said skid flanges;

said alignment blocks being spaced from said skid flanges so as to freely engage said rail faces therebetween to prevent canting and cocking of said slider member relative to said rails.

4. In a device as set forth in claim 1, said slide body channel between said rails being closed at one end and open at the other;

a bridge on said slide body over said rails at said open end of said channel having upstanding legs;

said slider member having outwardly extending inwardly springable cantilevered wings projecting toward said bridge legs when said slider member is in said channel adapted to abut said bridge legs to prevent said slider member moving through said channel open end;

said slider member wings springing inwardly when inserting said slider member through said bridge into said channel open end to permit easy mounting of said slider member in said slide body.

5. In a device as set forth in claim 1, said slider member having an axially bifurcated pin constituting spring fingers compressible together to reduce the radial cross-section of said pin facilitating pressing a part thereon having a receiving opening to attach the part to the pin without other attaching means.

6. In a device as set forth in claim 1, said slider member having an actuator foot constituting a handle for manually moving said slider member relative to said slide body.

7. In a device as set forth in claim 1, a second pair of torsion spring arms on said slider member oppositely disposed to said pair of torsion spring arms so as to involve bi-directional substantially equal clutch holding force and movement effort force;
- a first pair of alignment blocks on said slider member opposite sides endwise outwardly of said spring arms on one said end of said slider member overlying said faces of said rails lying spaced from and opposite to said skid flanges.
- a second pair of alignment blocks on said slider member opposite sides outwardly of said spring arms on the other end of said slider member lying spaced from and opposite to said skid flanges;
- said alignment blocks being spaced from said skid flanges so as to freely engage said rail faces therebetween to prevent canting and cocking of said slider member relative to said rails;
- said slide body channel between said rails being closed at one end and open at the other;
- a bridge on said body over said rails at said open end of said channel having upstanding legs;
- said slider member having outwardly extending inwardly springable cantilevered wings projecting toward said bridge legs when said slide member is in said channel adapted to abut said bridge legs to prevent said slider member moving through said channel open end;
- said slider member wings springing inwardly when inserting said slider member through said bridge into said channel open end to permit mounting of said slider member in said slide body;
- said slider member having an axially bifurcated pin consituting spring fingers compressible together to reduce the radial cross-section of said pin facilitating pressing a part thereon having a receiving opening to attach the part to the pin without other attaching means; and
- said slider member having an actuating foot constituting a handle for manually moving said slider member relative to said slide body.

References Cited
UNITED STATES PATENTS 590,544   9/1897   Hancock _____ 188—40

DUANE A. REGER, Primary Examiner

U.S. Cl. X.R.

74—531; 188—38